(12) United States Patent
Herzen et al.

(10) Patent No.: US 9,549,328 B2
(45) Date of Patent: Jan. 17, 2017

(54) METHOD TO OPTIMIZE THE COMMUNICATION PARAMETERS BETWEEN AN ACCESS POINT AND AT LEAST ONE CLIENT DEVICE

(71) Applicant: ECOLE POLYTECHNIQUE FEDERALE DE LAUSANNE (EPFL), Lausanne (CH)

(72) Inventors: Julien Herzen, Mezieres (CH); Ruben Merz, Berlin (DE); Patrick Thiran, Belmont-Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 189 days.

(21) Appl. No.: 14/250,730

(22) Filed: Apr. 11, 2014

(65) Prior Publication Data

US 2014/0307571 A1  Oct. 16, 2014

Related U.S. Application Data

(60) Provisional application No. 61/810,790, filed on Apr. 11, 2013.

(51) Int. Cl.
*H04L 12/26* (2006.01)
*H04W 24/02* (2009.01)
(Continued)

(52) U.S. Cl.
CPC ............. *H04W 24/02* (2013.01); *H04W 36/30* (2013.01); *H04W 36/06* (2013.01)

(58) Field of Classification Search
CPC .... H04W 72/082; H04W 24/02; H04W 36/30; H04W 36/06
(Continued)

(56) References Cited

U.S. PATENT DOCUMENTS

2006/0159003 A1* 7/2006 Nanda .................. H04W 16/10
370/203
2007/0298810 A1* 12/2007 Kasher ................. H04W 16/14
455/452.1
(Continued)

OTHER PUBLICATIONS

Paramvir Bahl et al. "White Space Networking With Wi-Fi Like Connectivity", in ACM SIGCOMM'09, Aug. 17-21, 2009 (12 pages).
(Continued)

*Primary Examiner* — Faisal Choudhury
(74) *Attorney, Agent, or Firm* — DLA Piper LLP US

(57) ABSTRACT

A method to optimize the communication on a channel between an access point and at least one client device, said channel being characterized by a center frequency and a bandwidth, comprises: establishing a connection on a first channel according to a first center frequency and a first bandwidth; exchanging data through this first channel between the access point and the client device; monitoring a first interference level on the first channel; the access point, while the data are exchanged, executes: informing the client device to switch to a second channel having a different center frequency and/or a different bandwidth; determining a second interference level on the second channel; comparing the first interference level with the second interference level; deciding to switch back or keep the second channel based on the comparison.

13 Claims, 8 Drawing Sheets

(51) Int. Cl.
*H04W 36/30* (2009.01)
*H04W 36/06* (2009.01)

(58) Field of Classification Search
USPC .......................................................... 370/252
See application file for complete search history.

(56) References Cited

U.S. PATENT DOCUMENTS

| | | | | |
|---|---|---|---|---|
| 2009/0116400 | A1* | 5/2009 | Sekiya | H04W 72/082 370/252 |
| 2010/0279618 | A1* | 11/2010 | Morton | H04B 1/1027 455/63.1 |
| 2013/0010719 | A1* | 1/2013 | Shapira | H04W 72/082 370/329 |
| 2014/0301328 | A1* | 10/2014 | Yacovitch | H04W 16/02 370/329 |

OTHER PUBLICATIONS

Daniel Brélaz, "New Methods to Color the Vertices of a Graph", Communication of the ACM, vol. 22, No. 4, pp. 251-256, Apr. 1979.
Pierre Bremaud, "Markov Chains: Gibbs Fields, Monte Carlo Simulation, and Queues" Springer-Verlag New York Inc., pp. vii-xvii, and 1-444, Copyright 1999.
Ranveer Chandra et al., "A Case for Adapting Channel Width in Wireless Networks", in ACM SIGCOMM'08, pp. 135-146, Aug. 17-22, 2008.
Bruno Kauffmann et al., Measurement-Based Self Organization of Interfering 802.11 Wireless Access Networks:, in INFOCOM'07, pp. 1451-1459, 2007.
Arunesh Mishra et al., "Partially Overlapped Channels Not Considered Harmful", in SIGMetrics/Performance'06, Jun. 26-30, 2006 (12 pages).
Shravan Rayanchu et al., "FLUID: Improving Throughputs in Enterprise Wireless LANs Through Flexible Channelization", In ACM MobiCom'11, pp. 1-20, Sep. 19-23, 2011.

* cited by examiner

METHOD TO OPTIMIZE THE COMMUNICATION PARAMETERS BETWEEN AN ACCESS POINT AND AT LEAST ONE CLIENT DEVICE

CROSS-REFERENCE TO RELATED APPLICATIONS

This application claims the benefit of U.S. Provisional Application No. 61/810,790, filed Apr. 11, 2013, which is incorporated by reference in its entirety.

I. INTRODUCTION 802.11 WLANs are presently experiencing a tragedy of the commons. In urban environments, with the exploding number of devices using unlicensed spectrum and with the dominating usage of 802.11 in home networks, several dozens of WLANs often have to share a limited spectrum. Furthermore, capacity intensive applications are pushing for newer 802.11 standards that use wider bandwidths (up to 40 MHz for 802.11n and up to 160 MHz for the newer 802.11ac), thereby increasing the amount of spectrum consumed by each WLAN. This increase in spectrum usage, however, can also create more interference and have adverse effects. If two wireless nodes are close enough and share some portion of the spectrum, they interfere with each other, which reduces their available capacity.

802.11 currently offers several channels in the unlicensed 2.4 GHz ISM and 5 GHz U-NII bands. These channels have a bandwidth of 20 MHz (802.11a/g/n). In practice, each channel can overlap its close-by neighboring channels, (see FIG. 1 for the 2.4 GHz band) and the interference depends on the amount of overlap [6]. Although channels can be configured, measurements from previous methods suggest that a vast majority of WLANs use default channel assignments, which is definitely sub-optimal.

Several approaches exist to efficiently assign channels to nodes in order to increase network performances (see e.g., [5]). In general, when all channels have the same width, the goal is to introduce as much spectral separation as possible between potentially interfering links. However, it has recently been pointed out that commodity 802.11 hardware can operate on various channel bandwidths (5, 10, 20 and 40 MHz) [4]. Even on a single link, using different bandwidths can radically change the observed performance.

Wider bandwidths offer potentially more capacity and throughput. For a fixed transmit power, however, narrower bandwidths increase the power per Hertz and the SNR, which can potentially increase the communication range [4].

When several interfering links are present, adapting the bandwidth provides an important additional degree of freedom. Obviously, if a link uses a narrow width, it creates less interference to neighboring links in the frequency domain. However, using a narrow width potentially reduces the capacity of this link. In addition, it takes more time to send a packet when using a narrow width, which increases the airtime consumption of this link and can create more interference in the time domain, similarly to the rate anomaly. It is therefore clear that the problem of jointly allocating center frequencies and bandwidths is significantly different from allocating only center frequencies. In particular, our goal is not only to reduce interference, but rather to conciliate an efficient global packing of spectrum chunks with the local benefits of using appropriate bandwidths.

We focus on home networks, i.e., residential WLANs with APs deployed in a chaotic fashion by individuals or different administrative entities. These networks are typically dynamic on relatively coarse timescales (say, hours), and they lack a global infrastructure to run centralized solutions. Hence, we target decentralized algorithms.

In addition to finding efficient configurations, a dynamic spectrum allocation mechanism must therefore be (1) decentralized, but also (2) online in order to adapt to changing network conditions, (3) transparent to minimize disturbances to ongoing traffic, and (4) usable on off-the-shelf hardware. The design of a truly decentralized scheme should rely only on local measurements. This raises a fundamental issue: the nodes regularly need to probe the availability of other channels and bandwidths. However, they have only one wireless interface1 to perform such out-of-band measurements.

Our main contribution is the design and evaluation of SAW (Spectrum Assignment for WLANs), a practical algorithm for online and distributed channel frequency and bandwidth assignment. SAW runs at the AP of a WLAN and relies exclusively on inter-neighbor measurements, without generating additional traffic. It is transparent and operates while the network is up and running. Nevertheless, it provably converges towards optimal allocations, in a sense that will be defined later. Finally, SAW improves the performance, even when only a subset of the interfering WLANs use it, therefore providing incentives for incremental deployment.

II. RELATED WORK

The problem of channel allocation without considering channel bandwidth has been largely studied in the context of cellular networks. It is commonly cast as graph-coloring [2] where an edge corresponds to interference between two cells, and the set of available colors corresponds to the set of channels. Because graph-coloring is NP-hard for general graphs, heuristics are used to solve it (typically, techniques based on [2]).

These techniques have been adapted to 802.11 WLANs as well. Their primary drawbacks are that they require a centralized knowledge of the interference graph and usually fail to capture much of the granularity of the interference between any two cells.

Some channel-allocation schemes have been developed specifically for WLANs. Some known method explicitly takes into account interference at the clients of each WLAN. However, it does not provide any optimality guarantee and it requires all the APs to be under a single administrative domain. MAXchop is a distributed algorithm that runs at the APs and computes channel hopping sequences. Unfortunately, it can get stuck in a local minimum, and there is no guarantee that the allocation patterns minimize interference across the network. In addition, MAXchop is not transparent, as it requires APs to periodically scan all the channels. Scanning can take up to several seconds and heavily disrupts communications. [5] proposes a provably optimal distributed channel-assignment algorithm that uses a Gibbs sampler [3]. Because it requires APs to run full channel scans to discover all the channels used by their neighbors, the algorithm is not appropriate for online operation. These scans are necessary to compute the so-called partition function of the Gibbs measure used by APs to choose a new channel. Gibbs samplers have been used for distributed resource allocation in different contexts.

Compared to the above works, SAW provably converges towards the stationary distribution of a Markov random field, but compared to [5], we avoid the costly computation of the Gibbs partition function by using a Metropolis sampler (see Section III-B). SAW is also traffic-aware, in the sense that it explicitly accounts for the airtime consumed by each link when computing the interference. But most importantly, SAW allocates bandwidths jointly with center frequencies, which none of the channel-allocation techniques does: these techniques solve a fundamentally different problem, which consists in maximizing the separation between the channels used by neighboring nodes. Because the channel bandwidth directly impacts the experienced capacity, this goal cannot be considered in isolation in our case. Recent work has shown that the channel bandwidth has quite an impact on interference and overall performance [4]. More recently, [7] proposes a centralized spectrum assignment algorithm and gives useful information on the trade-offs involved when tuning channel center frequencies and bandwidths. Here again, [7] target enterprise networks, as they rely on the presence of a centralized coordinator. Such a coordinator does not exist for residential WLAN deployments.

The problem of spectrum allocation has also been studied in the context of cognitive radios for white space networks [1].

BRIEF DESCRIPTION OF THE FIGURES

The present invention will be better understood thanks to the attached figures in which.

III. DETAILED DESCRIPTION

The following detailed description is believed to be particularly applicable to communications and communications devices conforming to the 802.11 standard and variants thereof (e.g., 802.11b, 802.11g, etc.) and hence will be primarily discussed in that context herein. The present invention should, however, not be understood to be limited to communications and communications devices conforming to the 802.11 standard.

Figure 15:
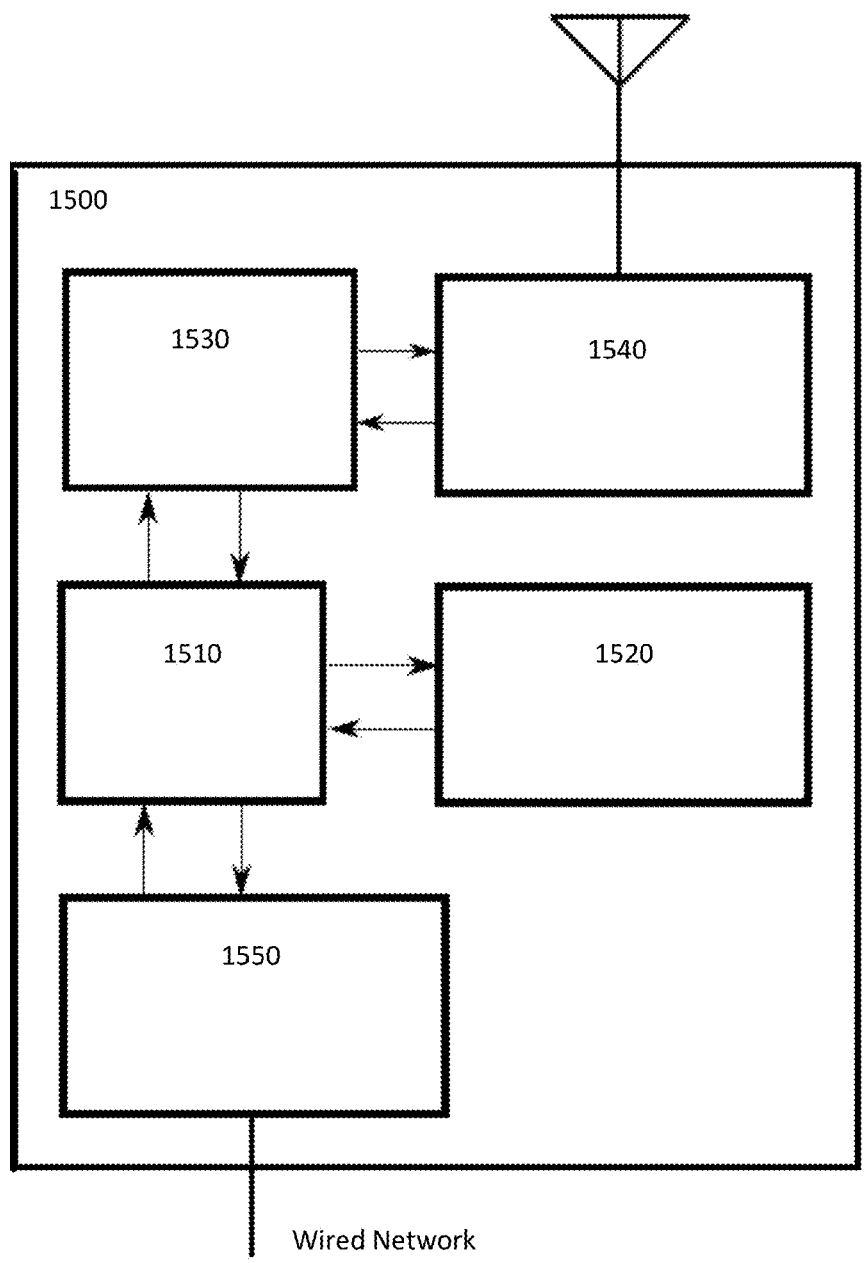
FIG. 15. Block diagram of an access point according to one embodiment.

A block diagram of an exemplary wireless local area network (WLAN) access point 1500 (e.g., a wireless router) according to one embodiment of the invention is illustrated in FIG. 15. The access point 1500 includes and is controlled by a processor 1510. Connected to the processor 1510 is a memory 1520 which stores the program corresponding to the SAW. The Access point 1500 comprises a network controller 1530 which is the interface with the RF Front-end 1540. The Network controller 1530 is in charge of the wireless protocol with the remote devices.

The access point 1500 comprises a Wired Network Interface 1550 which connect the Access Point 1500 with a wired network. The processor 1510 is configured to control the access point 1500 to perform the SAW algorithm described below. It should be understood that the various components of the access point 1500 may be separate physical devices, or, in alternative embodiments, the function of one or more of the components may be combined into a single physical device.

In the following description, we will use the term band to denote a particular combination of channel frequency and bandwidth.

A. Preliminaries: WLANs Modeling

SAW builds on an interference metric (Section III-A3). In order to formally define this metric, we need to describe neighborhood relationships. This is achieved in two steps, in Sections III-A1 and III-A2. We first build a link-centric model, and then extend it to the specifics of WLANs, with APs and clients.

1) Link-Centric Model and Neighborhood System:

Let L define a set of links, F a finite set of frequencies and B a finite set of channel bandwidths. Each link l∈L comprises two nodes, acting as a transmitter or receiver for this link. Each node has only one wireless transceiver. Therefore, the transmitter and receiver of a given link must use the same band in order for communication to take place. For a link $l, f_l \in F$, respectively $b_l \in B$, denotes the frequency, respectively the channel bandwidth. We assume that traffic at transmitters is stationary. Finally, for link l, $\mu_l \in [0, 1]$ denotes the average proportion of time during which a node occupies the medium (namely, the airtime ratio of l). In practice, $\mu_l$ depends on the 802.11 time sharing mechanism, the physical rates used on link l, and $b_l$.

For any pair of links l, k, we say that l and k are mutual neighbors (and interfere) if there exists a configuration ($f_l$, $b_l$, $f_k$, $b_k$) such that two of the four nodes composing l and k belong to different links and receive frames from each other. Then $N_l$ is the set of neighbors of link l. By definition, the neighborhood relationship is symmetric, i.e., $k \in N_l \Leftrightarrow l \in N_k$. Note that this does not imply symmetric interference levels: as specified in Section III-A3, two neighbors can mutually interfere to a different extent. With this model, a link is considered as a neighbor if its transmitter is in the communication range of any node of another link. In this sense, it captures both exposed and hidden terminal situations. However, it does not capture interferers that are not within communication range, as it relies on the ability of the interferers to decode each other's frames. Detecting interferers outside the communication radius in a distributed setting is an interesting—and orthogonal—problem on its own, which we do not address herein.

2) *From Link to WLANs: BSS-Centric Model:*

We now tailor our model to co-existing and possibly interfering BSSs. A BSS is a set of nodes, where one node is an AP and those remaining are clients. Compared to isolated links, all traffic goes either to or from the AP. Therefore, all nodes of a BSS must use the same band. We assume the AP is in charge of choosing the band for its BSS.

Let A be a set of N BSSs. For a BSS $A \in \mathcal{A}$, a link l belongs to A (and we write $l \in A$) if both nodes of l belong to A. In this case, one node of l is of course the AP of A. Then, two BSSs A and B are neighbors if there exist two links $l \in A$ and $k \in B$ such that $l \in N_k$. If A and B are neighbors, we write $A \in N_B$. The symmetry of the link neighborhoods implies $A \in N_B \Leftrightarrow B \in N_A$.

In addition, we write $f_A \in F$ and $b_A \in B$ for the center frequency and channel bandwidth used by the BSS A, respectively. We denote by $F \in \mathcal{F}_N$ and $B \in \mathcal{B}_N$ the center frequencies and the bandwidths used by the N BSSs, respectively.

3) *Interference Metric:*

SAW needs a metric to quantify the amount of interference between any two links.

For two links l and k, let $I_l(k)$ denote the link-interference created by k on l. In addition, let $IF(l, k)$ denote the interference factor (see [5]). This factor describes the amount of overlap between the two spectrum masks used on links l and k. Then, we define $$I_l(k) = \begin{cases} \mu_k \cdot IF(l, k) & \text{if } k \in \mathcal{N}_l \\ 0 & \text{otherwise} \end{cases} \quad (1)$$

$$\text{with } IF(l, k) = \int_{-\infty}^{+\infty} S_k(f) S_l(f - |f_l - f_k|) df,$$

where $S_k$ is the transmit mask of link k, and $S_l$ is the mask used on link l. The 802.11 standard defines the characteristics of masks. They change with channel bandwidth: for a given transmit power, the emitted power per unit Hz increases as the channel bandwidth decreases (see [4]). Note that $I_l(k)$ is not equal to $I_k(l)$ in general.

Figure 1:
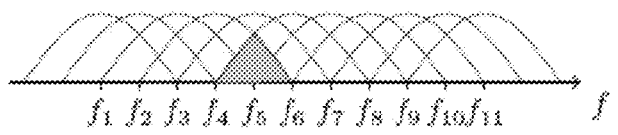
FIG. 1: Schematic view of the 11 IEEE 802.11 channels in the 2.4 GHz ISM band. The inter-channel separation is 5 MHz and each channel is 20 MHz wide. Therefore, some channels partially overlap with each other.
Figure 2:
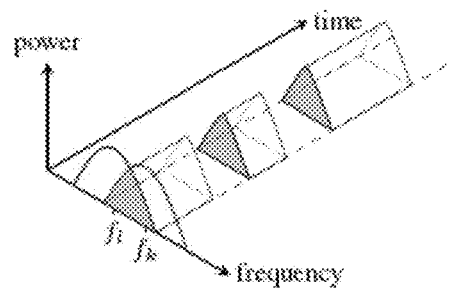
FIG. 2: the interference $I_l(k)$ (Eq. (1)) can be seen as the average sum of the volumes spanned by the channel overlaps over time. The time intervals without volume correspond to the intervals during which k is idle.

Equation (1) requires some discussion. With partially overlapping channels, $IF(l, k)$ accurately capture the interference between l and k (also confirmed for 802.11n with channel bonding). In Eq. (1), we augment this interference factor and multiply it by the proportion of time a given interfering link is active ($\mu_k$). This naturally extends the notion of interference to both the spectral and temporal domains (see FIG. 2), and accounts for the fact that a link is more likely to cause interference if its airtime is high. It is also used as a way to account for the difference in airtime consumption at different widths. Note that a natural extension could be to modulate $I_l(k)$ by the power that link l receives from an interfering neighbor. However, a consistent estimation of power requires careful calibration of the cards, which is often not the case for off-the-shelf hardware. We therefore leave this extension for future work.

Finally, let $I_A(B)$ be the BSS interference that a BSS A experiences from a BSS $B \in N_A$. Using link-interference, $$I_A(B) = \sum_{l \in A} \sum_{k \in B} I_l(k). \quad (2)$$

Again, generally, $I_A(B) \neq I_B(A)$.

B. *SAW Algorithm*

Recall that an efficient joint allocation of center frequencies and bandwidths needs to balance a global minimization of interference with the use of locally appropriate bandwidths. We therefore formulate the center frequency and bandwidth allocation task as a network-wide cost minimization problem, where the cost is the sum of the BSS interference plus a penalty that each BSS attributes to the exploitation of a given bandwidth. As will become clear later, this formulation conveniently exhibits optimal solutions that can be well approximated by the steady state of a Markov chain, whose transitions are precisely given by our algorithm. Formally, let the energy of the network be $$\mathcal{E}(F, B) = \sum_{A \in \mathcal{A}} \sum_{B \in N_A} I_A(B) + \sum_{A \in \mathcal{A}} cost_A(b_A), \quad (3)$$

where $cost_A(b_A)$ is the cost that BSS A attributes to using bandwidth $b_A$. This cost is used in the take into account the bandwidth used by the channel, i.e. a larger bandwidth can accommodate an higher interference level. An AP can choose a cost function that favors larger bandwidths (and hence provides greater theoretical capacity) or it can decide to favor narrow bandwidths if some of its links have poor SNRs. This formulation is similar to the energy of a magnetic system in statistical physics, where the local spin interactions correspond to the interference, and an external field favors "better" bandwidths. The optimization problem is then $$\text{minimize} \mathcal{E}(F, B) \text{ over } F, B \in \{ \mathcal{F} \times \mathcal{B} \}^N, \quad (4)$$

SAW is described in Algorithm 1. The algorithm runs at the AP of each BSS. In the next section, we show that with SAW running at each AP, the spectrum allocation converges towards the minimum of Problem (4). The algorithm uses two real parameters, the average wake-up time $\lambda$ and a temperature T, whose role is explained in Section III-C. At the AP of a BSS A, SAW is executed repeatedly, at random time intervals. During an execution, the AP randomly samples a center frequency and a channel bandwidth ($f_{new}$, $b_{new}$). The AP measures $K_{i,A}$ (line 8), the local sum of (a) the interference currently experienced by the BSS A, (b) the interference caused by the BSS A on its neighbors with the current band ($f_A$, $b_A$), and (c) the cost that A attributes to using $b_A$. It then measures $K_{j,A}$ (line 9), the same sum if the BSS A were to use ($f_{new}$, $b_{new}$) instead. It is to be noted that only one parameter can be changed i.e. $\{b_A = b_{new}$ and $f_A \neq f_{new}\}$ or $\{b_A \neq b_{new}$ and $f_A = f_{new}\}$. We explain how to measure $K_{i,A}$ and $K_{j,A}$ in Section III-D, and we give more information on the influence of the function $cost_A(b_A)$ in Section IV-C. If the new band ($f_{new}$, $b_{new}$) sampled by the AP appears better than ($f_A$, $b_A$) (in the sense of Eq. (3)), it is accepted and the BSS A switches to this new band. If it is worse, a chance is left to this band, and it is accepted with a non-zero probability by the AP. The acceptance probability depends on how bad the band is: bands that appear very bad are less likely to be accepted by the AP. Having a non-zero probability to accept worse bands is necessary in order to ensure that the algorithm does not get stuck in a local minimum of Problem (4).

---

Algorithm 1 SAW algorithm at BSS A

1: Initialization:
2: Setup an exponential timer of mean wake-up time λ
3: Pick a temperature T > 0
4: Pick a random configuration $(f_A, b_A)$ {F × B}
5:
6: When the timer fires:
7: Pick a random configuration $(f_{new}, b_{new})$ {F × B}
8: Measure $K_{i,A} := \Sigma_{B \in N_A}(I_A(B) + I_B(A)) + cost_A(b_A)$ when A does use the combination $(f_A, b_A)$
9: Measure $K_{j,A} := \Sigma_{B \in N_A}(I_A(B) + I_B(A)) + cost_A(b_{new})$ if A were to use the configuration $(f_{new}, b_{new})$
10: Compute $$\beta_{ij} = \begin{cases} e^{(\kappa_{i,A} - \kappa_{j,A})/T} & \text{if } \kappa_{j,A} \geq \kappa_{i,A}, \\ 1 & \text{if } \kappa_{j,A} < \kappa_{i,A}. \end{cases}$$

11: Set $(f_A, b_A) = (f_{new}, b_{new})$ with probability $\beta_{ij}$
12: Reschedule the timer

---

The above steps refer to a method to optimize the communication on a channel between an access point and at least one client device, said channel being characterized by a center frequency and a bandwidth, said method comprising:
  establishing a connection on a first channel according to a first central frequency and a first bandwidth,
  exchanging data through this first channel between the access point and the client device,
  monitoring a first interference level on the first channel, the access point, while the data are exchanged, executes:
    informing the client device to switch to a second channel having a different central frequency and/or a different bandwidth,
    determining a second interference level on the second channel,
    comparing the first interference level with the second interference level,
    deciding to switch back or keep the second channel based on the comparison.

It is understood that many parameters are involved in the configuration of a channel. The two parameters of interest according to this invention are the center frequency $f_A$ and the bandwidth $b_A$. One or both of these parameters can be changed to define another channel. Since we will focus our attention on the center frequency, the comparison of the interference level is based on two channels having at least a different center frequency $(f_A \neq f_{new})$. According to this example embodiment, the optimization method is based only on comparison of the interference level determined on two different channels having the same bandwidth (|B|=1). Other examples can take into account the variation of the bandwidth as well.

The level of interference in a given band is quantified by overhearing the packets transmitted by other surrounding WiFi devices in this band, i.e. the occupancy of the band. The interference level increase with the occupancy of the band. For each overheard packet, it is possible to know the size of this packet (i.e., its number of Bytes), as well as the physical data rate at which it has been sent. Dividing the packet size by the data rate, it is therefore possible to know the actual time duration of the packet. We can thus use the durations of each overheard packet to measure the average time occupancy of the band. This average occupancy value can be used as an estimation of interference. It is also possible to extend it, for example by multiplying it by the average power with which each overheard packet is received. According to another example, the comparison between two bands is done by taking into account both the interference levels (as described above) and an additional factor term, which accounts for the benefit provided by the bandwidths of the two bands. In particular, when two bands with similar interference levels are compared, the role of this factor is to favor the band with the largest bandwidth (as it can potentially provide more capacity).

SAW is a Metropolis sampler for the channel center frequency and bandwidth. Compared to Gibbs samplers [5], the main advantage of SAW is that it only needs to assess two configurations at a time. In particular, when considering the channel width in addition to the center frequency, an AP running a Gibbs sampler would need to assess all the |F×B| possible configurations. This does not scale when the number of possible combinations for the center frequency and bandwidth is large. SAW retains similar asymptotic convergence properties, but the number of measurements that are required in each time step is scalable with respect to the set of possible configurations, which allows for a practical and online implementation, even when the channel bandwidth is considered.

a) Reductions to Center-frequency or Bandwidth Selection: Note that the bands are sampled at lines 4 and 7 of Algorithm 1 from the set {F×B} of possible combinations of center frequencies and bandwidth. In the particular case where |B|=1 (i.e., there is only one available bandwidth), the sampled bands have a fixed bandwidth, and SAW naturally reduces to a fixed-width channel center-frequency allocation algorithm. In the other case where |F|=1, the sampled bands have a fixed center-frequency, and SAW reduces to a bandwidth allocation algorithm.

C. Convergence Analysis

Let us discretize time. A time slot is started immediately before any one AP fires its timer. We denote by $X_n \in \{F \times B\}^N$ the global state of the network at time slot n. The following theorem states that the probability distribution taken by Xn converges towards a steady distribution that largely favors the states producing low energies.

Theorem 3.1:
Consider a network where all the BSSs run SAW with a given temperature T>0. Then Xn converges in distribution to $$\pi_i(T) = \frac{e^{-\varepsilon(i)/T}}{Z}, ,, \quad (5)$$

where Z is an appropriate normalizing constant.

Proof: Because of the exponential timers used by the APs, the discrete time process Xn is a Markov chain.

We use the classic nomenclature of Metropolis sampling (see for instance [3], Chapter 7). For any two states i, j∈{F×B}N, we write the transition probabilities from i to j as $p_{ij} = P(X_n = j | X_{n-1} = i) = q_{ij} \cdot \alpha_{ij}$.

With this notation, qij denotes the probability to sample state j when the chain is in state i, and $\alpha_{ij}$ is the probability, when in state i, to accept state j if it is sampled. We start by giving the expressions for $q_{ij}$ and $\alpha_{ij}$ when the distributed algorithm is applied, and we then establish the convergence. In the following, we say that two states i, j∈{F×B}N differ at exactly one BSS A if all the BSSs have the same configuration of center frequency and bandwidth in states in i and j, except for the BSS A that has a different configuration in i and j.

Because a time slot starts whenever a timer expires, exactly one AP out of the N APs wakes up at each time slot. This AP samples uniformly at random one new configuration in $\{F \times B\}$. Therefore, for any two states $i \neq j$, $$q_{ij} = q_{ji} = \frac{1}{N|\mathcal{F} \times \mathcal{B}|},$$

if i and j differ at exactly one BSS, and $q_{ij} = q_{ij} = 0$ otherwise.

We now characterize the acceptance probabilities $\alpha_{ij}$. Observe that given $i = (F,B) \in \{F \times B\}^N$, we can rewrite $\epsilon$ as $$\mathcal{E}(i) = \sum_{\{A,B\} \subseteq \mathcal{A}, A \neq B} (I_A(B) + I_B(A)) + \sum_{A \in \mathcal{A}} cost_A(b_A).$$

This can in turn be rewritten as a sum over all the cliques C of the BSS neighborhood system $$\mathcal{E}(i) = \sum_C V(C),$$

with $$V(C) = \begin{cases} I_A(B) + I_B(A) & \text{if } C = \{A, B\} \text{ and } A \in \mathcal{N}_B, \\ cos_A(b_A) & \text{if } C = A, \\ 0 & \text{otherwise.} \end{cases}$$

Note that this means that $\epsilon$ derives from a potential (see [3]). For our purpose, it implies that if we consider any two states i, $j \in \{F \times B\}^N$ that differ at exactly one BSS A, then we have $$\epsilon(i) - \epsilon(j) = \mathcal{K}_{i,A} - \mathcal{K}_{j,A},$$

where Ki,A, respectively Kj,A, are the interference observed by A at lines 8 and 9 of Algorithm 1, when the network is in state i, respectively in state j. Therefore, we have $$\alpha_{ij} = \beta_{ij} = \min\{1, e^{(\epsilon(i) - \epsilon(j))/T}\},$$

where $\beta_{ij}$ is the local acceptance probability used at line 10 of Algorithm 1.

$X_n$ is ergodic and it is easy to check that $\pi_i(T)$ satisfies the detailed balance equations $\pi_i p_{ij} = \pi_j p_{ji}$ when plugging in the expressions for $q_{ij}$ and $\alpha_{ij}$. Therefore, (5) is the unique stationary distribution of Xn. Also, since the chain is aperiodic, Xn converges in distribution to (5).

A classic Markov chain argument shows that the convergence to steady state happens at geometric speed. The distribution (5) puts "exponentially" more mass on configurations that produce low global energies, especially if T is small. Indeed, consider the set of global minima of problem (4)

$$H = \{i \in \{\mathcal{F} \times \mathcal{B}\}^N : \epsilon(i) \leq \epsilon(j) \forall j \in \{\mathcal{F} \times \mathcal{B}\}^N\},$$

then $\pi_i(T)$ is maximal on H, and $$\lim_{T \downarrow 0} \pi_i(T) = \begin{cases} \frac{1}{|H|} & \text{if } i \in H, \\ 0 & \text{if } i \notin H. \end{cases}$$

(see Example 8.6, Chapter 7, in [3]).

The temperature T represents a tradeoff between exploration and exploitation. In particular, a small value of T ensures near asymptotic convergence to the global minima of problem (4). Larger values of T can be used to introduce more randomness that can help to avoid being trapped in a local minimum. However, as we observe in Section IV-B, realistic network topologies convey enough natural randomness so that $T \approx 0$ yields the best results in practice. This also directly implies that the algorithm converges to global minima of Problem (4).

D. Interference Measurements

All the decisions taken by SAW rely on the measurements of $K_{i,A}$ and $K_{j,A}$ at lines 8 and 9 of Algorithm 1.

At the AP of BSS A, computing $K_{i,A}, K_{j,A}$ requires to measure the link-interference between links belonging to A and links in neighboring BSSs. If any neighbor of A uses a band that partially overlaps with A and comprises some links with a non-zero airtime, it contributes to the interference term. Thus, in order to evaluate $K_{i,A}$, respectively, $K_{j,A}$, the algorithm needs to measure the link-interference in all the bands that overlap with $(f_A, b_A)$, respectively, with $(f_{new}, b_{new})$. We refer to these measurements as out-of-band measurements, because to be performed they require tuning to different bands. Note that this is not an artifact of our algorithm, and similar out-of-band measurements need to be performed by any decentralized spectrum-assignment algorithm.

1) Micro-Sensing:

We enable out-of-band measurements by implementing what we call micro-sensing operations.

Figure 3:
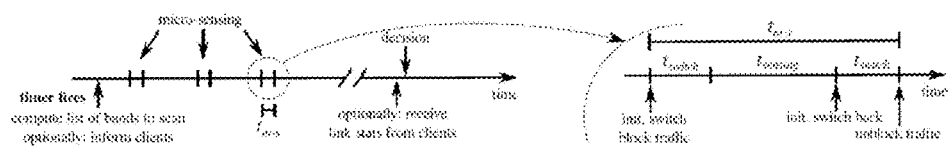
FIG. 3: Implementation of out-of-band monitoring with micro-sensing.

After randomly picking a new band, the AP of a BSS A computes the list of all bands that can potentially interfere with the current band $(f_A, b_A)$ and the sampled band $(f_{new}, b_{new})$ (knowing F, B and the spectrum masks defined in [1], this list is straightforward to obtain). The AP then tunes to each of these bands for a short amount of time. Now, instead of scanning all of these bands at once, the AP comes back to the operating band $(f_A, b_A)$ between each individual scan. The whole procedure is depicted in FIG. 3.

The amount of time spent in out-of-band sensing must be large enough for the nodes to have a fair chance of efficiently monitoring the band, and small enough so as not to disrupt traffic. This duration also depends on the bandwidth of the configuration currently being scanned: the time required to send a packet at a given rate is inversely proportional to the channel bandwidth. Therefore, larger bandwidths can be monitored faster. We denote by $t_{m-s}$ the overall time taken by one micro-sensing operation. As a micro-sensing operation requires switching back and forth between the operational and the monitored band, we have $$t_{m-s} = 2t_{switch} + t_{sensing}, \quad (6)$$

where $t_{switch}$ is the time required to tune to the target center frequency and bandwidth, and $t_{sensing}$ is the time spent monitoring, which depends on the channel bandwidth. In our implementation, we set $t_{sensing} = 240/b$ ms, where b is the bandwidth of the band to monitor in MHz. This duration is long enough to capture packets sent at low rates, but short enough (below 50 ms) to accommodate delay-sensitive traffic, even when a 5 MHz band is being sensed.

There is a trade-off between the amount of sensing and the accuracy of the interference estimation. As one micro-sensing operation is fast and inexpensive, our implementation senses each band several times to increase the probability of detecting potential neighbors, even if they do not transmit back-to-back packets. Even in this case, the algorithm could miss some neighbors that send only sporadic traffic and occupy little airtime. Note however that, by definition, these neighbors do not consume a significant portion of the available capacity, and missing them is less critical.

During each micro-sensing period, the AP monitors the medium and gathers link statistics. For each packet that it overhears, the AP records the corresponding band, a link ID (namely, the pair of source-destination MAC addresses), and it keeps an estimation of the airtime ratio of the link by computing the airtime consumed by the packet. This airtime is computed from the length of the packet, its physical rate, and the bandwidth that it occupies.

2) Client-Aware Extension:

Up to this point, the measurements are performed at the AP only. This is indeed a desirable feature, as it does not require client-side modification. In this case however, the AP could miss hidden nodes that interfere with some of its clients. This problem can be important in practice, as observed in works proposing centralized channel-assignment schemes. For this reason, and to remain consistent with our link neighborhood definition of Section III-A1, we propose an optional extension of SAW that performs monitoring at the clients as well. When the timer of an AP fires, this AP broadcasts a modified beacon that contains the sampled frequency band and a schedule for the corresponding micro-sensing operations. When the clients receive this beacon, they schedule the micro-sensing of the bands accordingly. Once they have monitored all the required bands, the clients wait a small, random amount of time (in order to avoid inter-client collisions) and send back to the AP all the statistics for the links that they overheard. This feature mitigates the impact of links that are hidden to the APs, but it comes at the price of client-side modifications. We implemented SAW both with ("client-aware"), and without ("client-agnostic") client monitoring. We compare the performance of the two versions in Section V.

E. Implementation Remarks

1) Micro-sensing and Decision Taking:

The micro-sensing operations are performed at the APs (and optionally at the clients). In contrast, the resource allocation decisions (namely, the center frequency and bandwidth) do not have to be made at the APs. The resource allocation decisions can be handled by a dedicated module, which can be implemented at any one of the following level:
 In the firmware of the AP network interface card(s).
 In the software driver(s) (kernel-space) of the AP NIC(s).
 In a user-space software at the AP. This is the option that we adopted in our own implementation described in Section V.
 In a separate module, external to the AP.

The closer the decision module is to the hardware, the more efficient its implementation can be made. However, implementing it in user-space (or possibly externally to the AP) results in hardware-agnostic code that is more easily reusable.

2) Client Notification and Backward Compatibility:

In order to communicate, an AP and its clients must operate on the same spectrum band. Therefore, once a decision is taken about which band to use, the corresponding AP has to inform its clients. This can be done by using existing standards providing signalization for dynamic frequency selection (e.g., IEEE 802.11h). In our user-level implementation, the AP sends a series of broadcast packets to all connected clients announcing the new band that it has chosen, and the scheduled time of the switch. It may be the case, however, that some clients are not compliant with SAW and/or cannot accept the new spectrum band chosen by their AP. In these situations, the switch to a new band should be aborted, in order not to drop the connection of these clients. It is possible for an AP to receive from the client a compatibility level representing the status of the latest software. The access point, based on the compatibility level can determine if the SAW can be executed. If one of the clients cannot execute the SAW, the whole process is aborted. When a client sends an association request frame to the AP, a version number is included into the request allowing the AP to determine if the client is compatible with the AP. The AP sets a corresponding compatibility bit in relation to that client. If this bit is not set (or not present), the AP considers that the client does not support SAW, and any further unsupported change of spectral configuration is disabled, as long as this client is associated to the AP.

IV. SIMULATION RESULTS

A. Simulation Setup

Before giving a detailed evaluation of SAW on an indoor 802.11 testbed in the next section, we investigate by using simulation its self-organization properties on large ecosystems of interfering WLANs. To this end, we developed our own simulator in Python. We do not simulate at the packet level, which would not scale well to such large networks. Instead, we use simpler models for computing interference and capacity.

Figure 4:
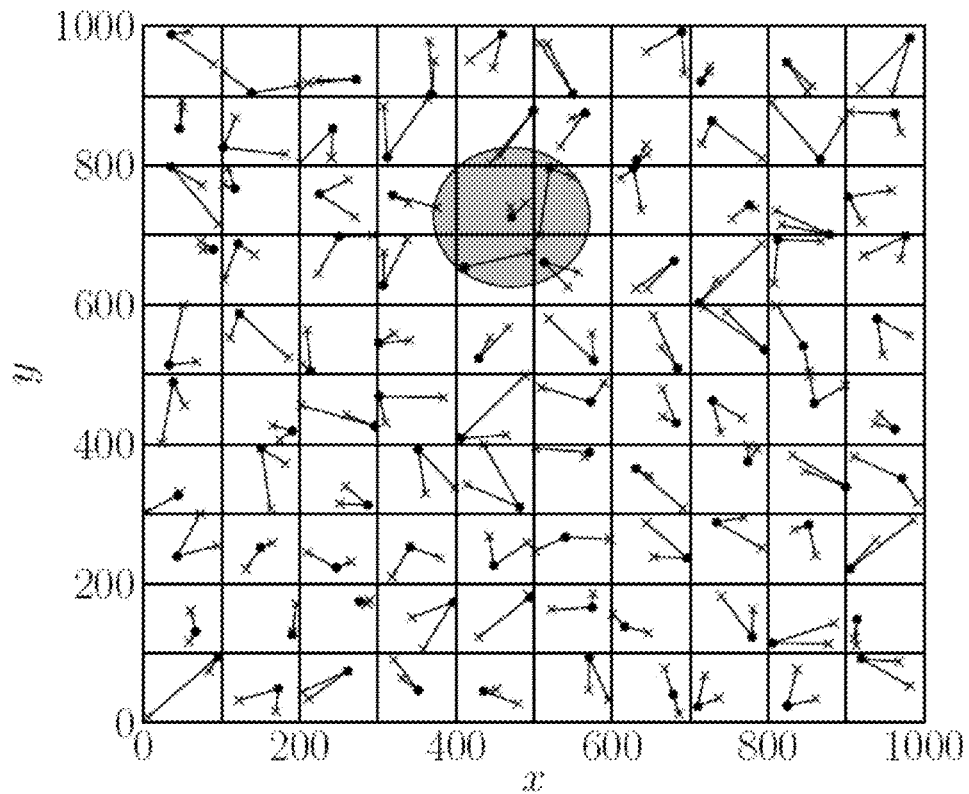
FIG. 4: Example of a grid composed of 100 cells, each of which contains one AP and two clients. The interference radius is R=100 m, as shown for one particular AP on the figure.

We assume Gaussian white noise, so that a link l enjoys a theoretical capacity $C_l = b_l \cdot \log(1 + SINR_l)$, where $SINR_l$ refers to the signal to interference-plus-noise ratio at the receiver of l. For any two nodes i and j within interference range, we compute the power received by j from i to be proportional to $d(i, j)^{-\alpha} \cdot IF(i, j)$, where $d(i, j)$ is the Euclidean distance between i and i, $\alpha$ is the path loss exponent—that we take equal to 3 in our simulations—and $IF(i, j)$ is the corresponding interference factor [6]. Note that this simple formulation for the capacity captures the trade-off between interference mitigation and the usage of larger bandwidths, through the logarithmic and pre-logarithmic terms, respectively. Unless otherwise stated, we take the local cost function to be $cost_A(b_A) = 1/b_A$ for each BSS, where $b_A$ is the bandwidth in MHz. Such a function favors wider bandwidths, and we evaluate its effect in Section IV-C. Unless otherwise stated, we consider a 1000 m×1000 m square grid, divided in 100 square cells. Each cell is occupied by one BSS, which is composed of one AP and two clients. The AP and the clients are placed uniformly at random within their cell. The interference radius is R=100 m (see FIG. 4 for an example). The results are insensitive to the scale of the units, and this setting can, for instance, be thought of as a simple model for residential WLANs, where each cell corresponds to an apartment in a building. We simulate downlink traffic. The APs transmit 100% of the time and the clients are idle. We consider a 2.4 GHz scenario, with eleven channels and four possible channel bandwidths (5, 10, 20 and 40 MHz). At initialization, each BSS picks a random channel and uses the largest width.

We evaluate three metrics: (1) the total amount of interference in the network. This is the first term of the energy function $\epsilon$ given by Eq. (3); (2) the sum of capacities of links in the network; and (3) the Jain fairness index of the capacities experienced by each BSS. This is $$\frac{\left(\sum_{A \in \mathcal{A}} C_A\right)^2}{N \sum_{A \in \mathcal{A}} C_A^2}$$

with $C_A$ denoting the sum of the link capacities of BSS A. We show the median values over 50 simulation runs, and the error bars on the plots are the 95% confidence intervals for the median.

B. Influence of the Temperature T

Figure 5A:
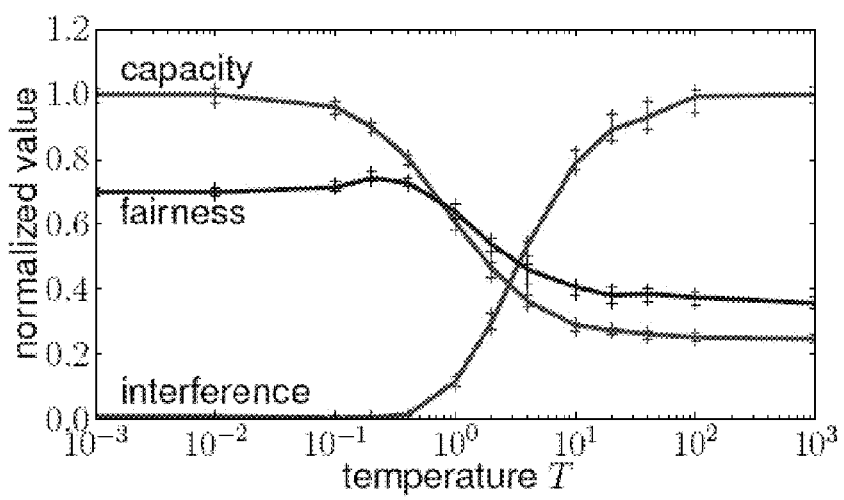
FIG. 5: The three metrics as functions of T (a) and c (b). (c) shows the evolution of the total network capacity as a function of the spatial node density, for several values of c. The plots are obtained after each AP completed 30 iterations of SAW on average.

The temperature T represents a trade-off between the likelihood to remain stuck in a local optimum and the asymptotic efficiency of SAW (see Section III-C). To understand this trade-off, we perform simulations with various temperatures spanning six orders of magnitude. Each simulation runs until each AP performed on average 30 iterations of SAW. In order to conveniently display the three metrics on a common plot, we normalize the capacity and the interference by their largest values. FIG. 5a shows that SAW performs better with respect to all the metrics when T is small. In practice, this implies that the risk to remain trapped in a local optimum is very low and small values of T can be used. Such values also ensure the best asymptotic performance of SAW. We use T=0.1 in the sequel.

C. Capacity vs Interference

In this section, we explore the influence of the weight that each BSS puts on its local cost function. We consider a scenario where each BSS A uses the function $\text{cost}_A(b_A) = c/b_A$, where c is a parameter that we vary. The BSSs can use different cost functions, according to the local benefit of each bandwidth. However, we study this particular function in detail because it is decreasing with the bandwidth $b_A$, and therefore exhibits well the inherent conflict existing between interference mitigation and maximization of theoretical capacity. It is also a practical function, which the BSSs can use whenever using a larger bandwidth would give them a better throughput. This is often the case in practice, when the links have sufficiently good SNRs [4].

Figure 5B:
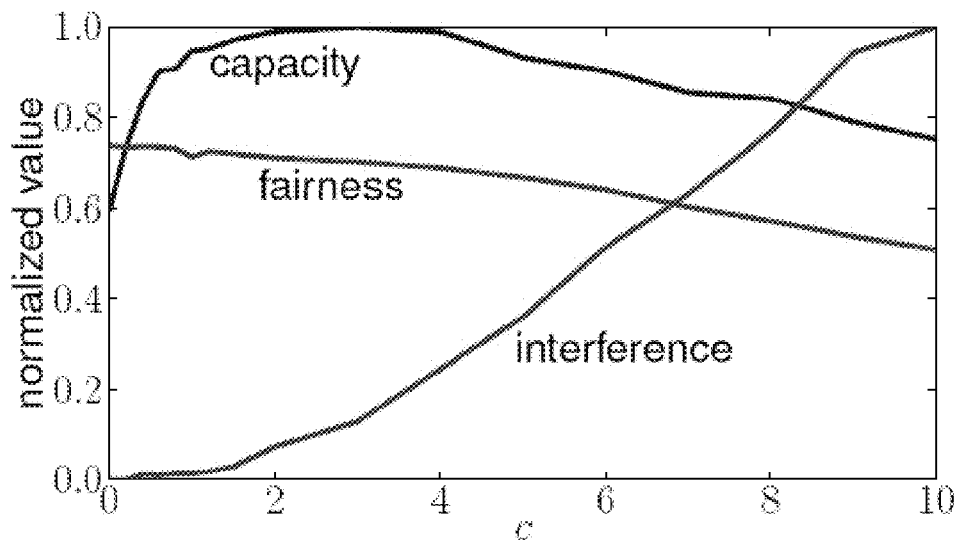
Figure 5C:
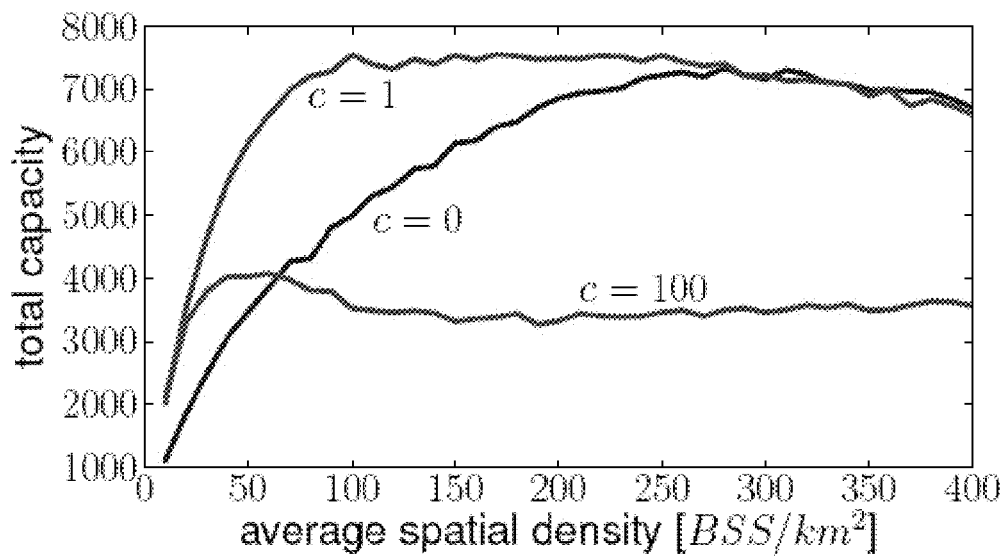

We show the influence of c on our three performance metrics in FIG. 5b. When c is zero, no weight is given to the local preferences of the BSSs, and the scheme targets only global interference minimization. In this case, it indeed finds interference-free configurations in a distributed way. This setting is well suited for fixed-width channel allocation, but it is not appropriate for varying bandwidths. Indeed, up to a 66% increase in capacity can arise when using configurations with a low, but a non-zero, interference level (with $1 \leq c \leq 6$). Using too large a value for c, however, decreases the benefits of all three metrics. Such configurations give much weight on local costs, which creates prohibitive interference levels. Intuitively, the best operational setting should depend on the network density: for networks that are spatially dense, it makes sense to give priority on interference mitigation. Whereas for sparse networks where the nodes have few or no neighbors, it is advantageous to give more priority on local preferences. This is illustrated on FIG. 5c, where we plot the total capacity when the spatial density of the network varies, for several values of $c^6$. As expected, c=0 performs the best on dense networks, and a large c is best for sparse networks. However, an intermediate value of c obtains the best performance in all regimes. This implies that such energy functions allow the algorithm to operate at the best spot of the interference-capacity trade-off, using a fixed parameter c, irrespective of the spatial node density.

D. Performance

Figure 6:
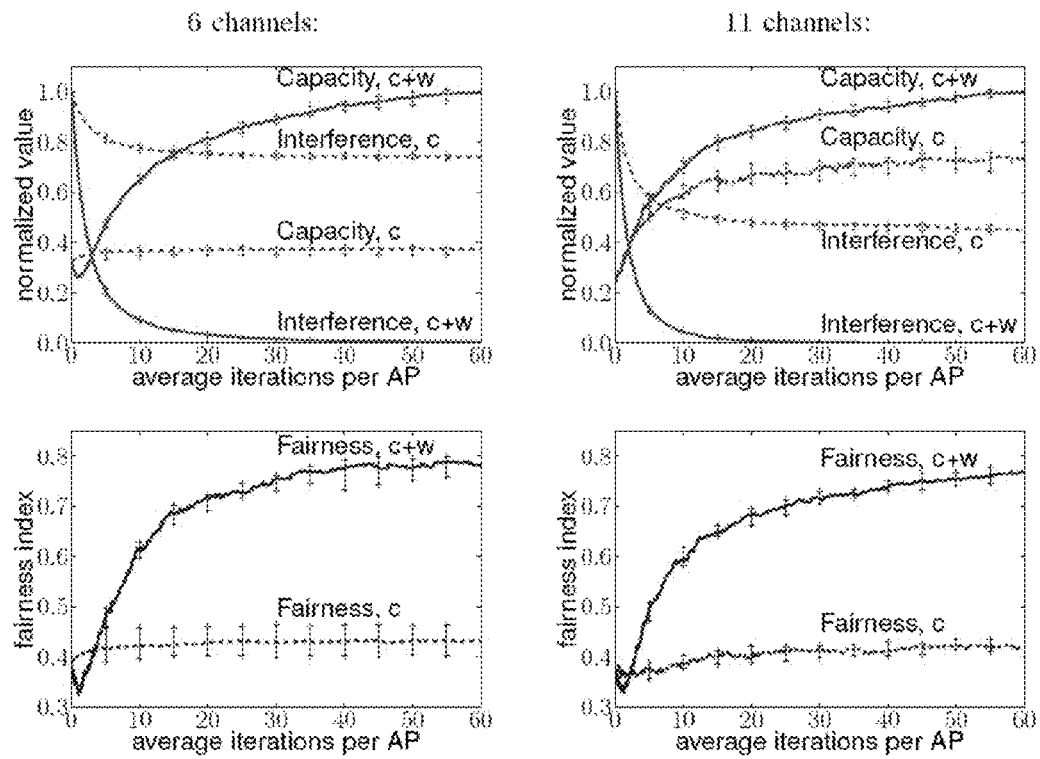
FIG. 6: Capacity, interference and fairness as functions of the number of iterations. We show the values obtained when SAW tunes both the channel center frequency and bandwidth (c+w), and when it tunes only the center frequency (c).

We evaluate the three metrics as functions of the number of iterations of SAW executed by the BSSs. FIG. 6 considers two cases, with 6 or 11 channels available (the latter is the 2.4 GHz spectrum case). In addition, we compare with a case where SAW only tunes the center frequency (and not the bandwidth). We make the following observations:

- By tuning both the center frequency and the bandwidth, SAW drastically improves all three metrics. Interference is completely mitigated with 11 channels and nearly mitigated with 6 channels. The capacity is multiplied by a factor 2 to 4 compared to random channel allocations.
- Jointly tuning the center frequency and the bandwidth offers drastic improvements compared to center frequency only, especially when the available spectrum is scarce.
- SAW quickly finds efficient allocations (even though the exact convergence is asymptotic).
- Besides, an iteration of SAW only involves the assessment of two configurations and is inexpensive to realize in practice.

E. Influence of the Proportion of BSSs Running SAW

Figure 7:
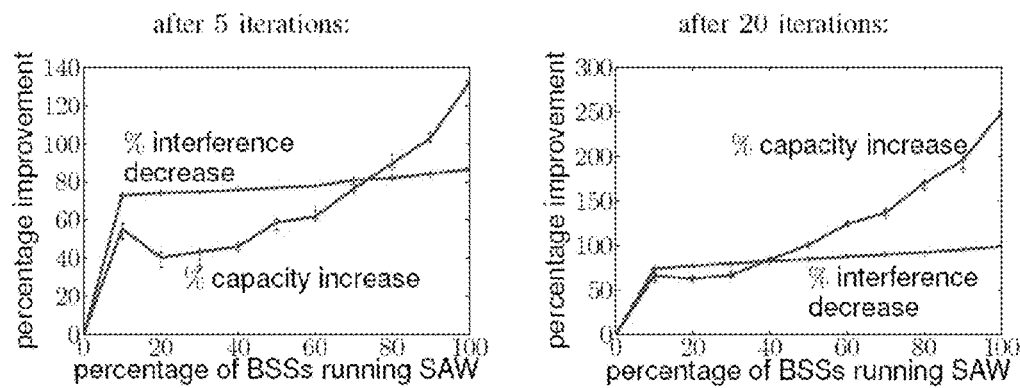
FIG. 7: Percentage of improvement (compared to random allocations of fixed bandwidth channels), as a function of the percentage of BSSs using SAW.

We evaluate scenarios where SAW runs on randomly chosen subsets of BSSs. We then compute capacity increase and interference decrease observed by the BSSs running SAW, compared to the initial random allocations of fixed bandwidth channels. FIG. 7 shows results when the proportion of BSSs running SAW varies from 0% to 100%, after 5 and 20 iterations per AP on average. The capacity always increases for the BSSs running SAW. Note that after 5 iterations, this capacity gain is not monotonic with respect to the proportion of BSSs running SAW. We attribute this to the larger convergence time due to the competition between an increased number of BSSs running SAW. Waiting for more iterations allows the APs to explore more configurations and attenuates this effect. Overall, even a small percentage of BSSs running SAW quickly produces a significant capacity increase, giving users incentives for incremental deployments.

F. Self-Organization Property

Figure 8:
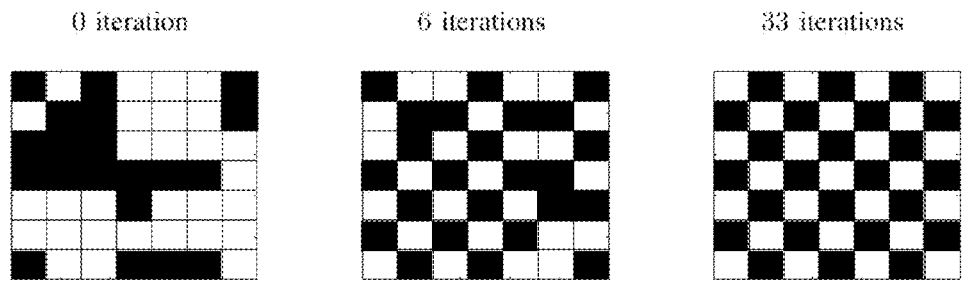
FIG. 8: Illustration of the self-organization on a grid network with 2 non-overlapping channels. SAW converges to an optimal channel allocation.

Finally, to visualize the self-organization and convergence of SAW, we simulate a deterministic grid topology. The APs and their clients are positioned such that each BSS interferes with the four BSS on the four closest neighboring cells. We consider a simplistic case with two orthogonal channels and fixed bandwidth. FIG. 8 shows the allocations found by SAW after 6 and 33 (average) iterations per AP. SAW quickly finds an efficient allocation (after 6 iterations), and converges to the optimal allocation. This scenario is equivalent to the simulation of interacting spins in the Ising model of statistical physics [3]. Note that in this very particular scenario, the algorithm can easily remain stuck in a local minimum if T is too low, because of the regularity of the topology. Therefore, we used T=1 in this particular set of simulations. Interestingly, this risk does not exist for realistic irregular topologies.

V. TESTBED RESULTS

A. Testbed and Implementation Description

Figure 9:
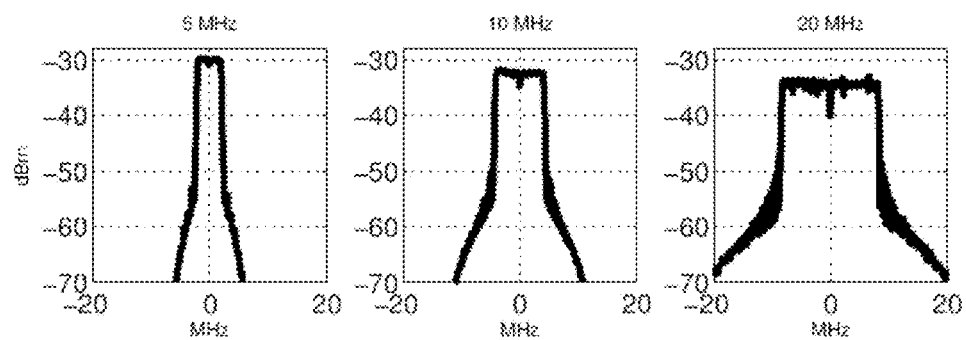
FIG. 9: Spectrum footprint of the AR9220 cards at 5, 10 and 20 MHz.
Figure 10:
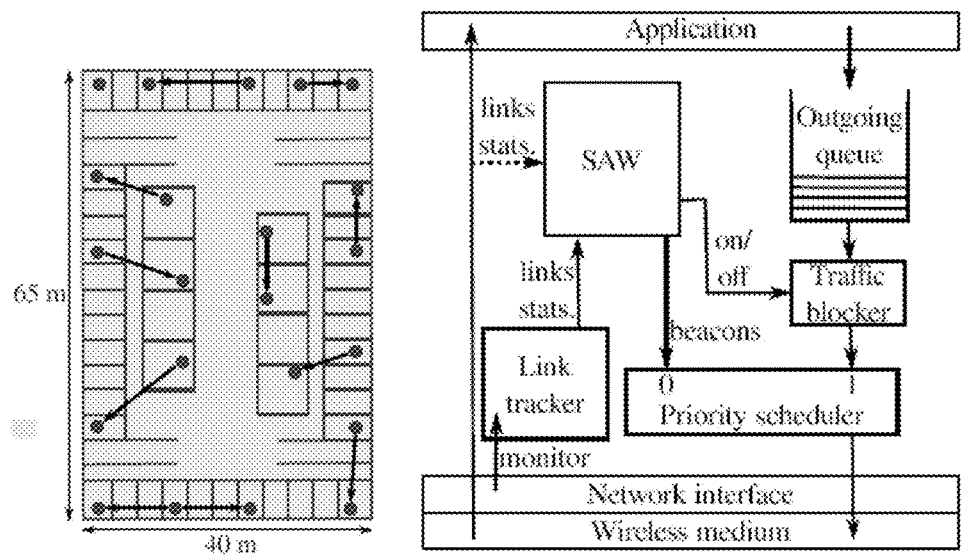
FIG. 10: Left: Map of the 21-node testbed. The BSSs are shown with arrows directed from the APs to their clients. Right: Implementation of SAW at an access point.

We use a testbed of 21 wireless nodes, which form 10 BSSs spread over a campus building floor (see FIG. 10 left). Each node is a PCEngine Alix 2D2 equipped with an Atheros AR9220 IEEE 802.11 mini-PCI adapter, running OpenWrt with the ath9k driver. This driver allows for using channel bandwidths of 5, 10 and 20 MHz (40 MHz is not currently available). We modified ath9k and added a debugfs entry to the Linux kernel, in order to accept live reconfiguration of the operating band in a few tens of milliseconds. We give more details on these timings in Section V-C. We performed all experiments during the night in the 2.4 GHz spectrum using 802.11g and the default rate adaptation mechanism of ath9k (Minstrel). The 5 GHz spectrum contains more channels, but we use the 2.4 GHz spectrum in order to create interference-rich scenarios with overlapping channels, where efficient spectrum assignments are non-trivial. We used a signal analyzer to measure the spectral footprints of our hardware when using channel bandwidth of 5, 10 and 20 MHz. As shown on FIG. 9, the cutoff values match well the widths of the channels, but there is leakage on adjacent channels. There is also a 3 dB gain when the bandwidth is divided by two. Therefore, when implementing the link-interference computation using equation (1), we consider the transmit and receive masks as perfect bandpass filters whose cutoff frequencies match the channel bandwidths, with an extra 2.5 MHz on each side. We empirically observed that this margin is enough to alleviate adjacent-channel interference. SAW is implemented in userspace using the Click modular router. We created four Click elements, which in total consist of about 2500 lines of C++ code. A schematic view of the role of each element within the networking stack of an AP is shown in FIG. 10 (right). The core logic of the algorithm is fed by link statistics that come from a link-tracker module, and optionally from the clients of the BSS. When performing micro-sensing, SAW temporarily blocks outgoing traffic, in order to reduce packet losses. Control traffic between AP and clients (switch announcements, scanning requests and scanning replies) is prioritized over data traffic in order to increase the accuracy of the scheduled switching times. Note that such control traffic is required by any distributed channel-assignment scheme and, in practice, it can be integrated within addendum of the IEEE standards (e.g., 802.11h).

All BSSs use $cost_A(b_A)=1/b^4$, the temperature is T=0.1 and the mean wake-up period is $\lambda=4$ minutes. Such a value offers a good trade-off between stability and reactivity to, for instance, the apparition or disappearance of a neighboring network. The interval between two micro-sensing is set to 500 ms, and each band is sensed five times.

B. Performance of SAW

We performed several experiments on four scenarios: with UDP or TCP and with the client-agnostic or clientaware versions of SAW. Traffic is backlogged, which represents a frequent use case where all the capacity is used, for instance when several clients are downloading simultaneously from the Internet. All BSSs start in channel 6 with a bandwidth of 20 MHz. As a benchmark, we use a centralized channel assignment based on graph-coloring. Specifically, we build an inter-BSS interference graph by having all the APs broadcast one packet (of size 1000B), each second during one hour. Two BSSs are neighbors if one of their APs receives at least P % the beacons sent by the other AP. Then, using the DSATUR graph-coloring algorithm [2], we take the largest value of P such that this graph is 3-colorable. Finally, we use the corresponding coloration to assign one of the three non-overlapping channels (channels 1, 6 and 11) to each BSS. This procedure is centralized and is a reasonable upper-bound of what can possibly be achieved with an unplanned deployment.

Figure 11:
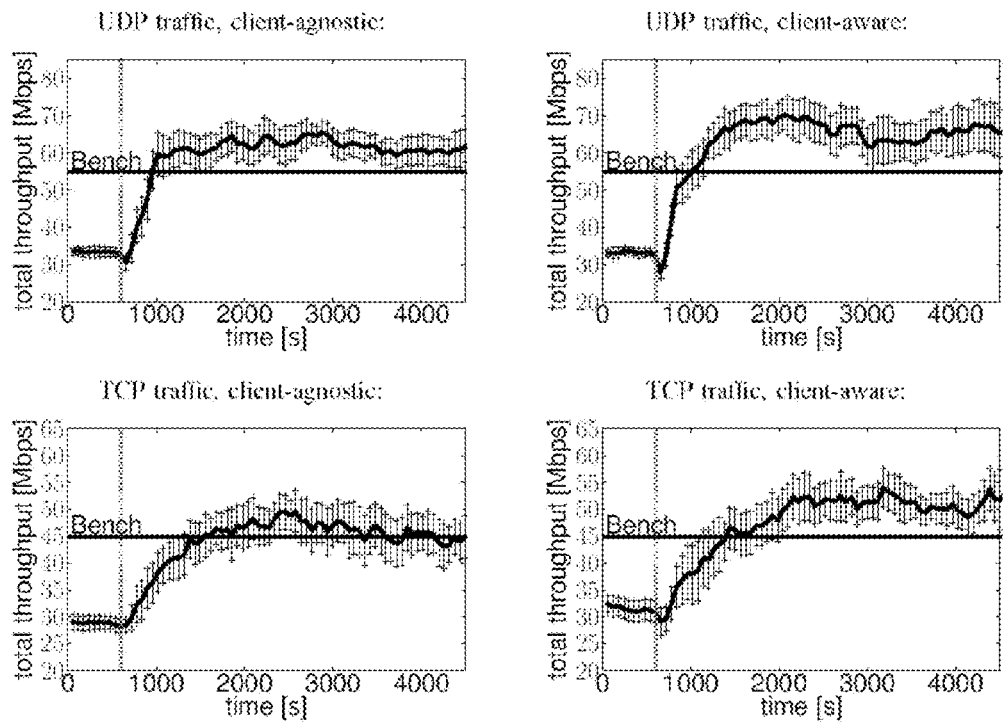
FIG. 11: Sum of the link throughputs obtained by the 10 BSSs with downlink traffic. SAW is started at 600 seconds. The "Bench" line is the average throughput obtained with a centralized graph coloring approach that uses the 3 non-overlapping channels with a width of 20 MHz.
Figure 12:
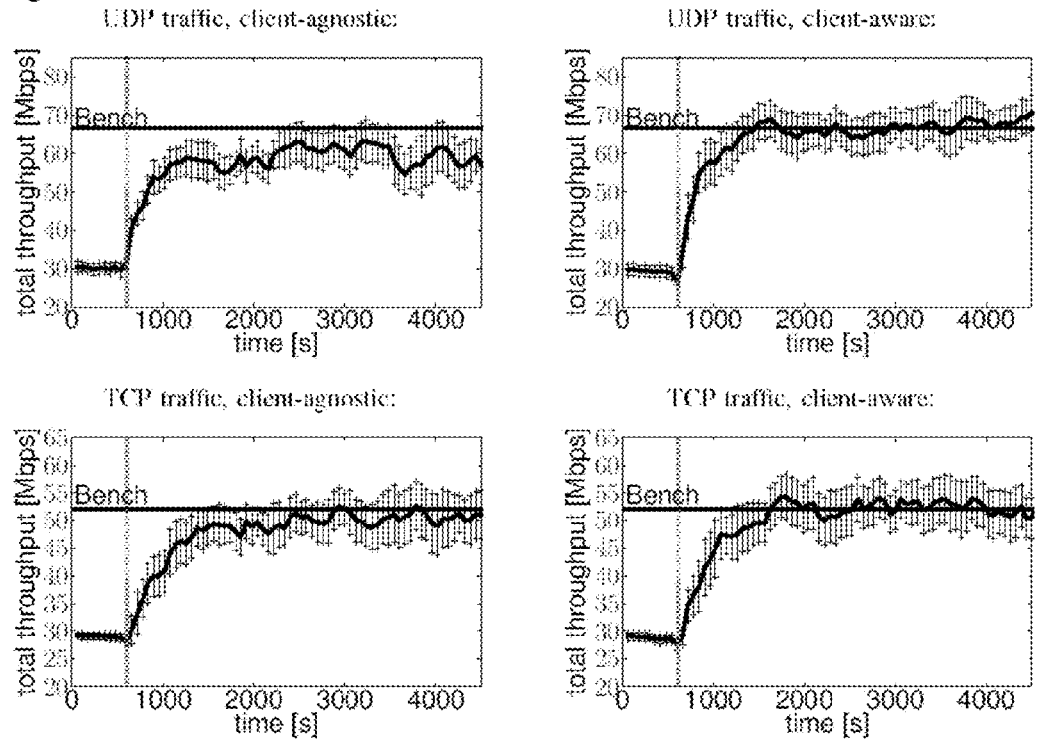
FIG. 12: Sum of the link throughputs obtained by the 10 BSSs with uplink traffic. SAW is started at 600 seconds. The "Bench" line is the average throughput obtained with a centralized graph coloring approach that uses the 3 non-overlapping channels with a width of 20 MHz.

FIG. 11 shows the average sum and the standard deviations (over 20 independent runs) of the throughputs achieved by each link, for downlink traffic (from APs to their clients). FIG. 12 shows the results for uplink traffic. We also show the average obtained with the benchmark. In each scenario, SAW starts at 600 seconds.

The client-aware version performs slightly better, both for UDP and TCP traffic. In general, SAW settles to spectrum assignments that are equivalent or better than centralized graph-coloring. The extra gain is due to the fact that SAW adapts both the frequency and bandwidth of the channel. In these experiments, much of the gain already comes after one or two iterations of SAW per BSS (iterations happen every 240 seconds on average), and the algorithm settles to efficient allocations after approximately 3 iterations per BSS on average. We emphasize that these results are obtained by using a completely decentralized and online implementation. This increase in network capacity does not come at the cost of fairness. In particular, it is not obtained by starving some of the BSSs for the benefit of others. For the first scenario, UDP traffic with the client-agnostic version of SAW, FIG. 13 (left) shows the evolution of the average Jain's fairness index of the throughput achieved by all the BSSs over time. Fairness in the remaining scenarios showed similar trends. The increase in capacity is spread fairly among the BSSs.

C. Micro-Sensing Evaluation

Figure 13:
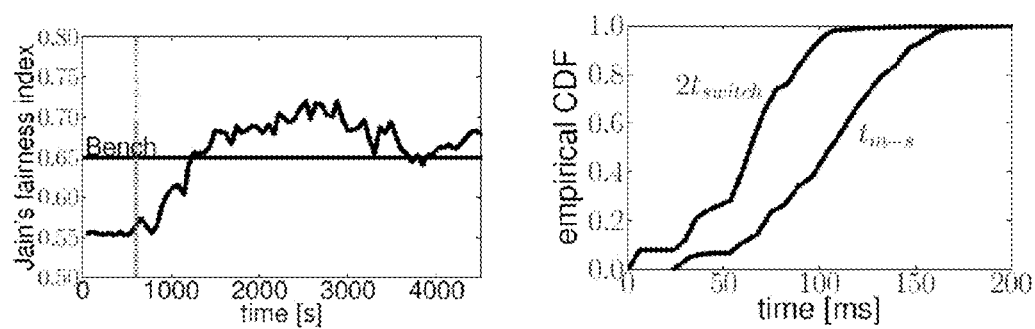
FIG. 13: Left: Jain's fairness index for the scenario with UDP traffic and client-agnostic version. Right: Empirical CDFs of the switching times and the micro-sensing times.

We evaluate the potential disturbance produced by the micro-sensing procedures. Because traffic is blocked while the AP (and optionally the clients) perform out-of-band monitoring, frames can experience an additional delay of up to $t_{m-s}$ (see Eq. (6)). FIG. 13 (right) plots the CDFs of $2t_{switch}$ and $t_{m-s}$ during the experiments of Section V-B. Although $t_{m-s}$ typically remains below 150 ms, this could still be non-negligible for delaysensitive traffic. However, this delay is mostly due to the hardware switching time, which is relatively high on our cards. Indeed, Atheros and other manufacturers report switching times of 2 ms or less for newer 802.11 chipsets8. With such chipsets, switching overhead becomes negligible, and the additional delay of the micro-sensing procedure can be upper-bounded by about 50 ms. This is low enough to be tolerated by most delay-sensitive applications.

Figure 14:
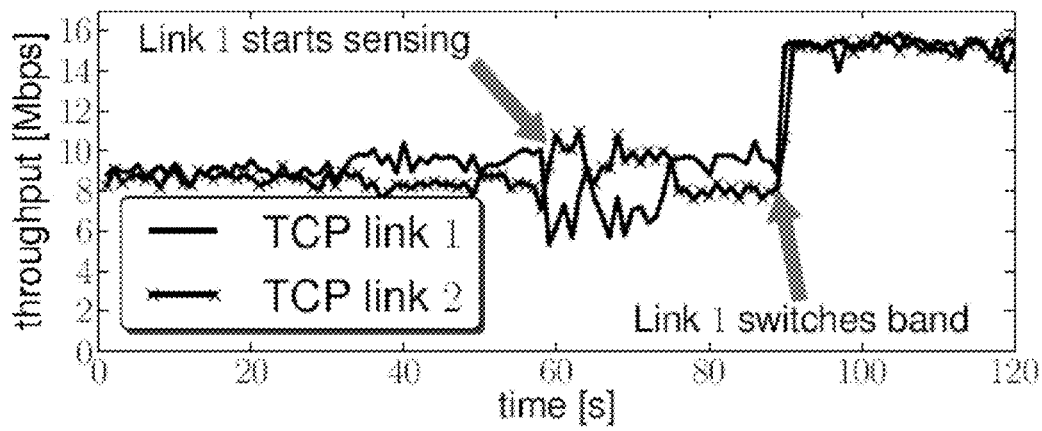
FIG. 14: Micro-sensing with TCP traffic.

We now show the impact of micro-sensing on TCP traffic. FIG. 14 shows the throughput of two close-by links, each with fully backlogged TCP traffic. At the beginning, both links use channel 1 with a bandwidth of 20 MHz. After 60 seconds, the AP of link 1 (the transmitter of this link) fires its timer and samples a new band (channel 11, 20 MHz). From 60 to 75 seconds, the AP of link 1 performs micro-sensing for all the bands that partially overlap with channel 1 or channel 11 (micro-sensing interval is 500 ms). At 75 seconds, the AP of link 1 decides to switch to the new band. From 75 to 90 seconds, it broadcasts modified beacons containing the time of the scheduled switch, which takes place at 90 seconds. Out-of-band sensing temporarily slightly reduces the TCP throughput. However, the throughput degradation is only marginal, even though the hardware has a relatively high switching latency.

VI. CONCLUSION

We have presented SAW, a decentralized algorithm that finds efficient variable-width spectrum configurations for WLANs. We have thoroughly validated its performance with testbed experiments and simulations. The spectrum allocation problem is formulated as the global optimization of an energy function, which is composed of neighbor interactions and local bandwidth preferences. When the network conditions do not change, SAW converges towards global minima of this function. In real dynamic settings, SAW constantly adapts spectrum usage. We have identified simple energy functions that enable the algorithm to solve the capacity-interference trade-off, irrespectively of the network spatial density. Thanks to its underlying Metropolis formulation, where only one new configuration is sampled at a time, SAW scales nicely with the total number of available channels and bandwidths. This property suggests that some of the concepts presented in this paper could be applicable to white space networks.

REFERENCES

[1] P. Bahl, R. Chandra, T. Moscibroda, R. Murry, and M. Welsh. White space networking with wi-fi like connectivity. In *ACM SIGCOMM* 09.
[2] D. Brélaz. New methods to color the vertices of a graph. *Commun. ACM*, 22:251-256, April 1979.
[3] P. Bremaud. *Markov Chains: Gibbs Fields, Monte Carlo Simulation, and Queues*. Springer-Verlag New York Inc., corr. edition, February 2001.
[4] R. Chandra, R. Mahajan, T. Moscibroda, R. Raghavendra, and P. Bahl. A case for adapting channel width in wireless networks. In *ACM SIGCOMM* 08, pages 135-146, 2008.
[5] B. Kauffmann, F. Baccelli, A. Chaintreau, V. Mhatre, K. Papagiannaki, and C. Diot. Measurement-based self organization of interfering 802.11 wireless access networks. In *INFOCOM* 07, pages 1451-1459, 2007.
[6] A. Mishra, V. Shrivastava, S. Banerjee, and W. Arbaugh. Partially overlapped channels not considered harmful. In *SIGMETRICS* 06, 2006.
[7] S. B. Shravan Rayanchu, Vivek Shrivastava and R. Chandra. FLUID: Improving throughputs in enterprise wireless lans through flexible channelization. In *ACM Mobicom* 11, 2011.

The invention claimed is:

1. A method to optimize communications on a channel between an access point and a plurality of client devices, said channel being characterized by a center frequency and a bandwidth, said method comprising:
   establishing by the access point a connection with the client devices on a first channel having a first center frequency and a first bandwidth;
   exchanging by the access point data through the first channel with the client devices;
   monitoring by the access point a first interference level on the first channel;
   reviewing compatibility levels to the access point from the client devices, a compatibility level for a client device defining whether the client device is able to dynamically switch from the first channel to another second channel having a different center frequency and if the client device will change channels in response to an instruction from the access point;
   instructing the client devices to switch to a second channel having a different center frequency and/or a different bandwidth only if all compatibility levels for all client devices indicate that all client devices are able to dynamically switch from the first channel to the second channel;
   determining by the access point a second interference level on the second channel;
   comparing by the access point the first interference level with the second interference level; and
   deciding by the access point whether to switch back to the first channel based on the comparison.

2. The method of claim 1, wherein the second center frequency is different than the first center frequency, and the second bandwidth is the same as the first bandwidth.

3. The method of claim 1, wherein the second center frequency is the same as the first center frequency, and the second bandwidth is different than the first bandwidth.

4. The method of claim 1, wherein the second center frequency is different than the first center frequency, and the second bandwidth is different than the first bandwidth.

5. The method according to claim 1, further comprising obtaining a compatibility level from each of the client devices.

6. A method to optimize communications on a channel between an access point and a plurality of client devices, said channel being characterized by a center frequency and a bandwidth, said method comprising:
   establishing by the access point a connection to the client devices on a first channel having to a first center frequency and a first bandwidth;
   exchanging by the access point data with the client devices through the first channel;
   monitoring by the access point a first interference level on the first channel;
   reviewing compatibility levels to the access point from the client devices, a compatibility level for a client device defining whether the client device is able to dynamically switch from the first channel to another second channel having a different center frequency and if the client device will change channels in response to an instruction from the access point;
   temporarily switching by the access point to a second channel having a different center frequency and/or a different bandwidth only if all compatibility levels for all client devices indicate that all client devices are able to dynamically switch from the first channel to the second channel;
   determining by the access point a second interference level on the second channel;
   comparing the first interference level with the second interference level; and
   if the second interference level is lower than the first interference level, informing the client devices to switch to the second channel and switching the communication to the second channel.

7. The method of claim 6, wherein the second center frequency is different than the first center frequency, and the second bandwidth is the same as the first bandwidth.

8. The method of claim 6, wherein the second center frequency is the same as the first center frequency, and the second bandwidth is different than the first bandwidth.

9. The method of claim 6, wherein the second center frequency is different than the first center frequency, and the second bandwidth is different than the first bandwidth.

10. The method according to claim 6, further comprising obtaining a compatibility level from each of the client devices.

11. An access point comprising:
    a processor;
    a wireless transceiver connected to the processor;
    wherein the processor is configured to
       establish via the transceiver communications with at least one client device on a first channel, said channel being characterized by a first center frequency and a first bandwidth;
       exchange data with the at least one client device via the transceiver through the first channel;
       monitor a first interference level on the first channel;

review a compatibility level to the access point from the at least one client device, a compatibility level for a client device defining whether the client device is able to dynamically switch from the first channel to another second channel having a different center frequency and if the client device will change channels in response to an instruction from the access point;

instruct the transceiver to change from the first channel to a second channel having a different center frequency and/or a different bandwidth;

determine a second interference level according to the second channel;

compare the first interference level with the second interference level;

if the second interference level is lower than the first interference level and if the compatibility level for the at least one client device indicates that the at least one client device is able to dynamically switch from the first channel to the second channel, instruct the at least one client device to change from the first channel to the second channel and instruct the transceiver to change from the first channel to the second channel.

12. The access point of claim 11, wherein the processor is configured to select the second channel with a different center frequency than the first center frequency, the second bandwidth being the same as the first bandwidth.

13. The access point of claim 11, wherein the processor is configured to select the second channel with a different bandwidth than the first bandwidth, the second center frequency being the same as the first center frequency.

* * * * *